No. 717,145. Patented Dec. 30, 1902.
H. J. VAN GELDER.
INDEX.
(Application filed Apr. 9, 1902.)
(No Model.)
Fig. 1.
Fig. 2.
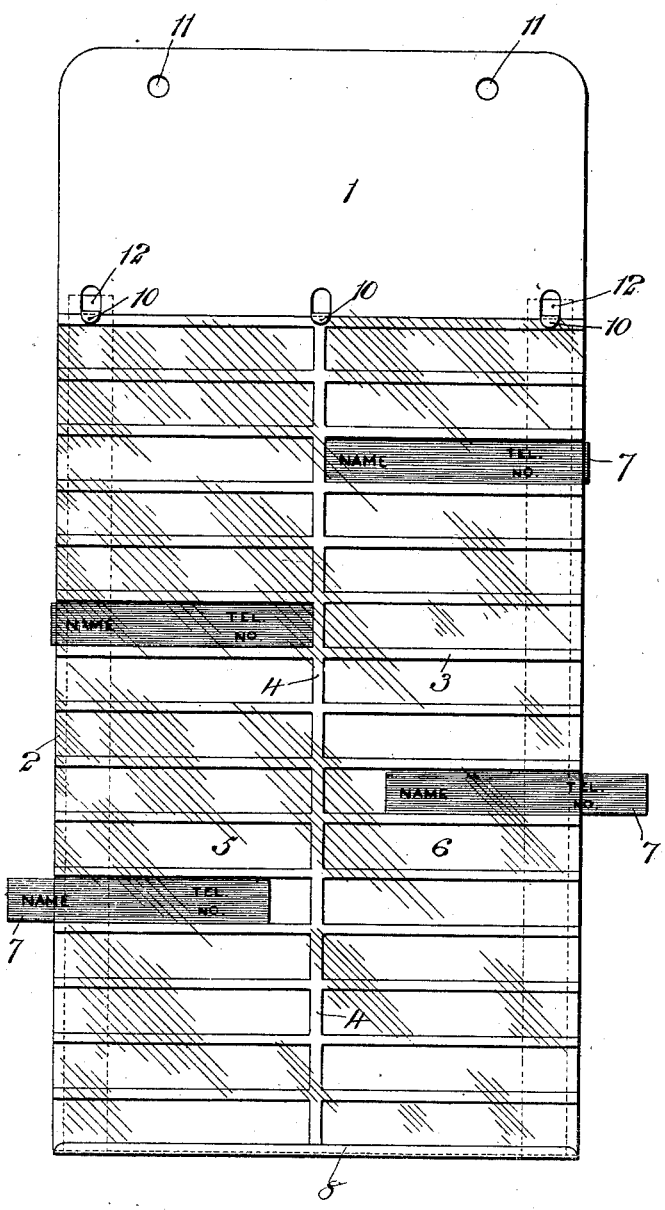
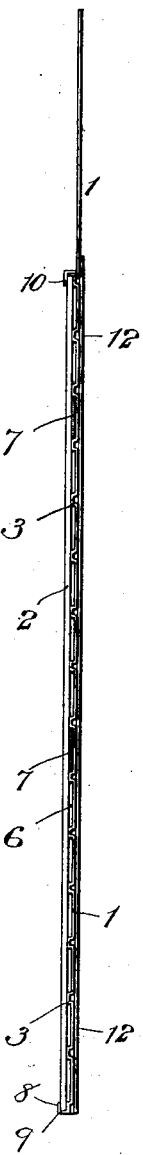
Witnesses:
George Barry Jr.
Henry Thieme.
Inventor:
Henry J. Van Gelder
by attorneys
Brown & Seward

UNITED STATES PATENT OFFICE.

HENRY J. VAN GELDER, OF BROOKLYN, NEW YORK.

INDEX.

SPECIFICATION forming part of Letters Patent No. 717,145, dated December 30, 1902.

Application filed April 9, 1902. Serial No. 102,011. (No model.)

*To all whom it may concern:*

Be it known that I, HENRY J. VAN GELDER, a citizen of the United States, and a resident of the borough of Brooklyn, in the city and State of New York, have invented a new and useful Improvement in Indexes, of which the following is a specification.

My invention relates to an improvement in indexes, and has for its object to provide an index comprising a back plate having a plurality of ribs thereon forming pockets for receiving reference-slips and a transparent front plate engaging said ribs for holding the slips in position, the mouths of the pockets being open at the sides of the index for facilitating the insertion and removal of the said reference-slips.

The index is more particularly intended for use as a perpetual reference and telephone index in which persons' names and their telephone-numbers can be placed upon slips or cards, which slips or cards may be inserted into and removed from the index as required to keep the index at all times up to date and accurate.

A further object is to provide an index of the above character which will be extremely simple in construction, inexpensive to manufacture, and attractive in appearance, the reference-slips at the same time being protected from dust and dirt.

A practical embodiment of my invention is represented in the accompanying drawings, in which—

Figure 1 is a front view of my improved index, and Fig. 2 is an edge view of the same.

The index comprises a back plate 1 and a transparent front plate 2. The back plate 1 is preferably made of sheet metal, and it has a plurality of horizontal or transverse ribs 3 struck therefrom, extending from side to side of the plate, and a centrally-arranged vertical rib 4, extending from the bottom of the plate to a point near the top of the same. These cross-ribs form two vertical series of pockets 5 and 6, having their mouths open through the sides of the plate. The transparent front plate 2 is held snugly in engagement with the ribs 3 and 4 for holding the reference-slips 7 in the pockets 5 and 6. This transparent front plate 2 is preferably secured to the back plate by means of tongues struck from the back plate and overlapping the top and bottom edges of the said transparent front plate. In the present instance the tongue 8 for holding the bottom of the transparent front plate is formed by bending the bottom of the plate upwardly the entire width of the plate, thus forming a groove 9, within which the bottom edge of the plate rests. The top edge of the transparent front plate is shown in the present instance as being held in position by a plurality of tongues 10, struck from the body of the sheet-metal back plate 1 and bent over the top of the said transparent front plate.

The back plate 1 may be left free from pockets a distance downwardly from the top, if desired, for the purpose of placing instructions, advertisements, or other printed matter thereon.

The index may be provided with means for suspending it upon any suitable support, as by providing the index with one or more holes 11 therethrough near its top.

If it is desired to strengthen the back plate along its side edges to prevent the buckling of the same, I may provide the back plate with two strips 12 of sheet metal, which may be soldered or otherwise secured along the rear face of the back plate adjacent to its sides.

It will be seen that the index constructed as above described is extremely simple and inexpensive to manufacture. It will further be seen that the use of cleats is entirely done away with, as the transparent front plate serves not only to protect the face of the reference-slips from dust and dirt, but also serves to hold the said reference-slips in their respective pockets. These reference-slips may be inserted or removed from the open mouths of the pockets at the sides of the index, as desired.

What I claim is—

1. An index comprising a plate of malleable metal struck up throughout its body portion into the form of ribs to form the two sides and an end wall of each of a series of pockets and provided with holding tongues or lips projecting from its face and a transparent plate covering the said ribs to complete the series of pockets open at the edges for the insertion of reference-slips, the said front plate being held in position by the aforesaid tongues or lips.

2. An index comprising a thin plate of malleable metal struck up throughout its body portion into the form of ribs to form the two sides and an end wall of each of a series of pockets and provided with holding tongues or lips projecting from its face, a transparent plate covering the said ribs to complete the series of pockets open at the edges for the insertion of reference-slips, the said front plate being held in position by the aforesaid tongues or lips, and strengthening-strips secured to the back of the thin malleable metal plate.

In testimony that I claim the foregoing as my invention I have signed my name, in presence of two witnesses, this 7th day of April, 1902.

HENRY J. VAN GELDER.

Witnesses:
FREDK. HAYNES,
HENRY THIEME.